US006779117B1

(12) United States Patent
Wells

(10) Patent No.: US 6,779,117 B1
(45) Date of Patent: Aug. 17, 2004

(54) AUTHENTICATION PROGRAM FOR A COMPUTER OPERATING SYSTEM

(75) Inventor: Joseph W. Wells, Newbury Park, CA (US)

(73) Assignee: CyberSoft, Inc., Conshohocken, PA (US)

( * ) Notice: Subject to any disclaimer, the term of this patent is extended or adjusted under 35 U.S.C. 154(b) by 0 days.

(21) Appl. No.: 09/360,213

(22) Filed: Jul. 23, 1999

(51) Int. Cl.[7] .......................... H04L 9/00; G06F 11/30; G06F 15/173; G06F 15/16
(52) U.S. Cl. ..................... 713/200; 713/164; 713/165; 713/166; 713/201; 709/223; 709/224; 709/226; 709/229
(58) Field of Search ................................. 713/200, 201, 713/164, 165, 166; 709/223, 224, 226, 229

(56) References Cited

U.S. PATENT DOCUMENTS

| | | | |
|---|---|---|---|
| 5,440,723 A | * 8/1995 | Arnold et al. ................. 714/2 |
| 5,473,769 A | 12/1995 | Cozza |
| 5,502,815 A | 3/1996 | Cozza |
| 5,668,999 A | 9/1997 | Gosling |
| 5,740,441 A | 4/1998 | Yellin et al. |
| 5,748,964 A | 5/1998 | Gosling |
| 5,757,914 A | 5/1998 | McManis |
| 5,822,517 A | 10/1998 | Dotan |
| 5,970,252 A | * 10/1999 | Buxton et al. .............. 717/166 |
| 6,029,256 A | * 2/2000 | Kouznetsov ................. 714/38 |
| 6,044,399 A | * 3/2000 | Elledge ....................... 709/220 |
| 6,161,176 A | * 12/2000 | Hunter et al. ................. 713/1 |
| 6,167,523 A | * 12/2000 | Strong ........................ 713/201 |
| 6,275,938 B1 | * 8/2001 | Bond et al. ................. 713/200 |
| 6,338,141 B1 | * 1/2002 | Wells ......................... 713/200 |

OTHER PUBLICATIONS

MCSE NT Workstation 4, 1996, pp. 165–172.*

* cited by examiner

Primary Examiner—Ayaz Sheikh
Assistant Examiner—Jenise Jackson

(57) ABSTRACT

A Computer Authentication System, CASA; a software application which performs file authentication functions in any Microsoft® Windows® registry based computer operating system. The CASA system modifies the manner in which Microsoft® Windows® executes application programs. This modification allows the CASA software to easily specify authentication functions to be performed on executed applications, including, but not limited to virus scanning, security access validation, license auditing, version checking, file change detection, and/or usage logging. CASA operates by altering the Windows® registry so that the CASA application starts before execution of the user specified application, applies authentication functions to the user specified application, and takes appropriate actions based on the results of said authentication. This method provides a significant improvement over existing authentication procedures because the CASA application executes only when needed, executes without user intervention, allows multiple authentication functions to be performed at once, and does not use up resources on the host computer when not in use.

8 Claims, 20 Drawing Sheets

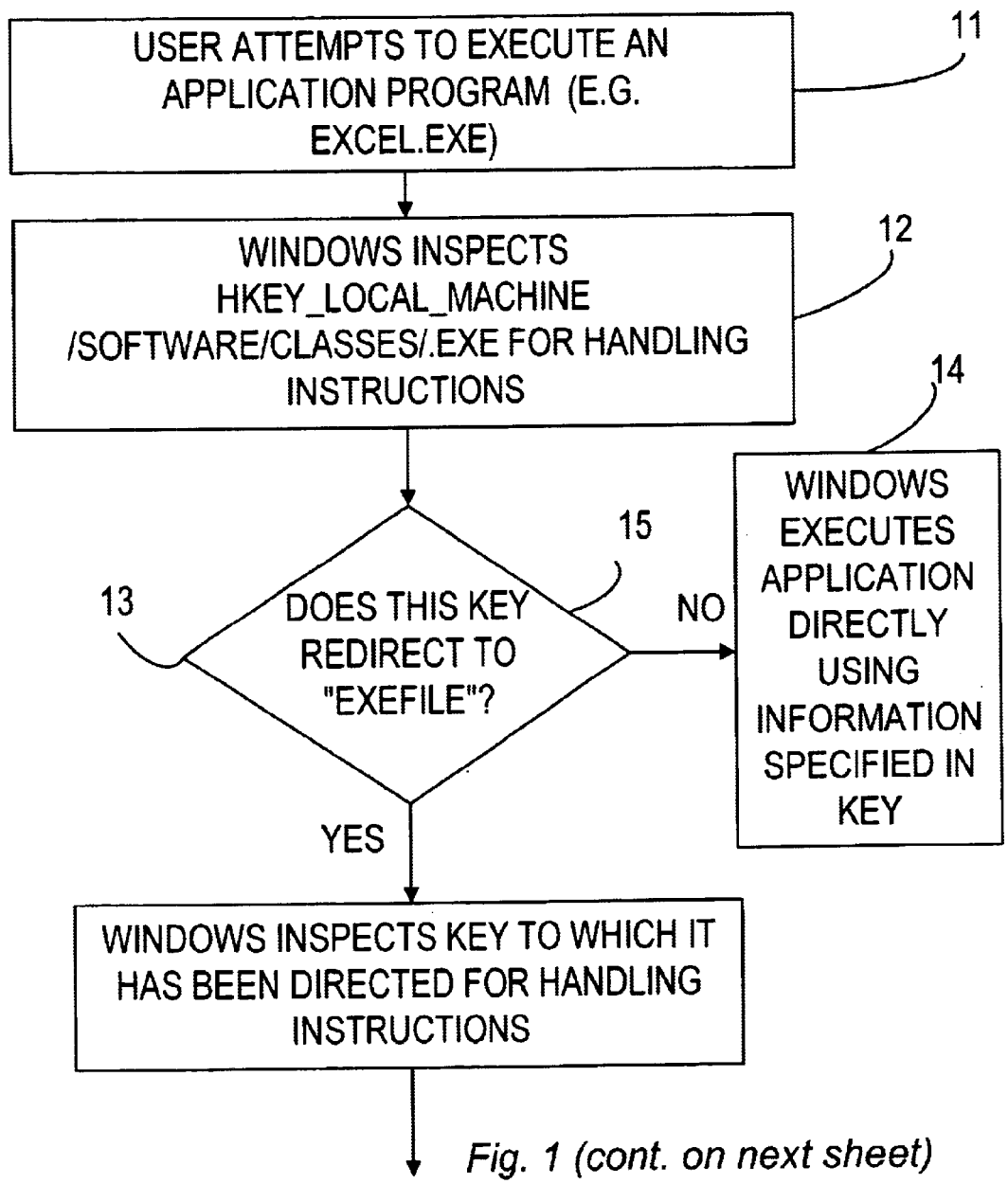
Fig. 1 (cont. on next sheet)

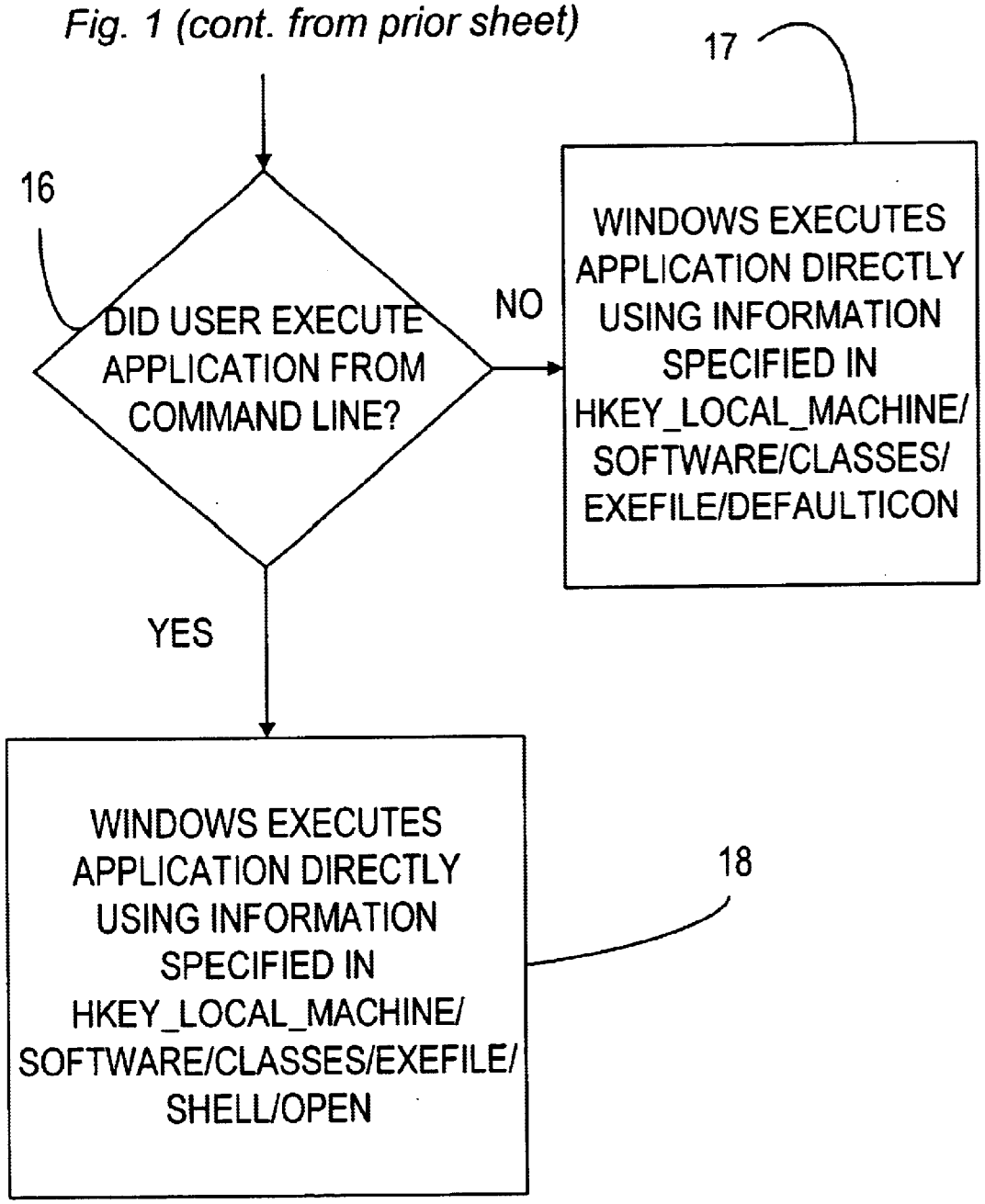
Fig. 1 (cont. from prior sheet)

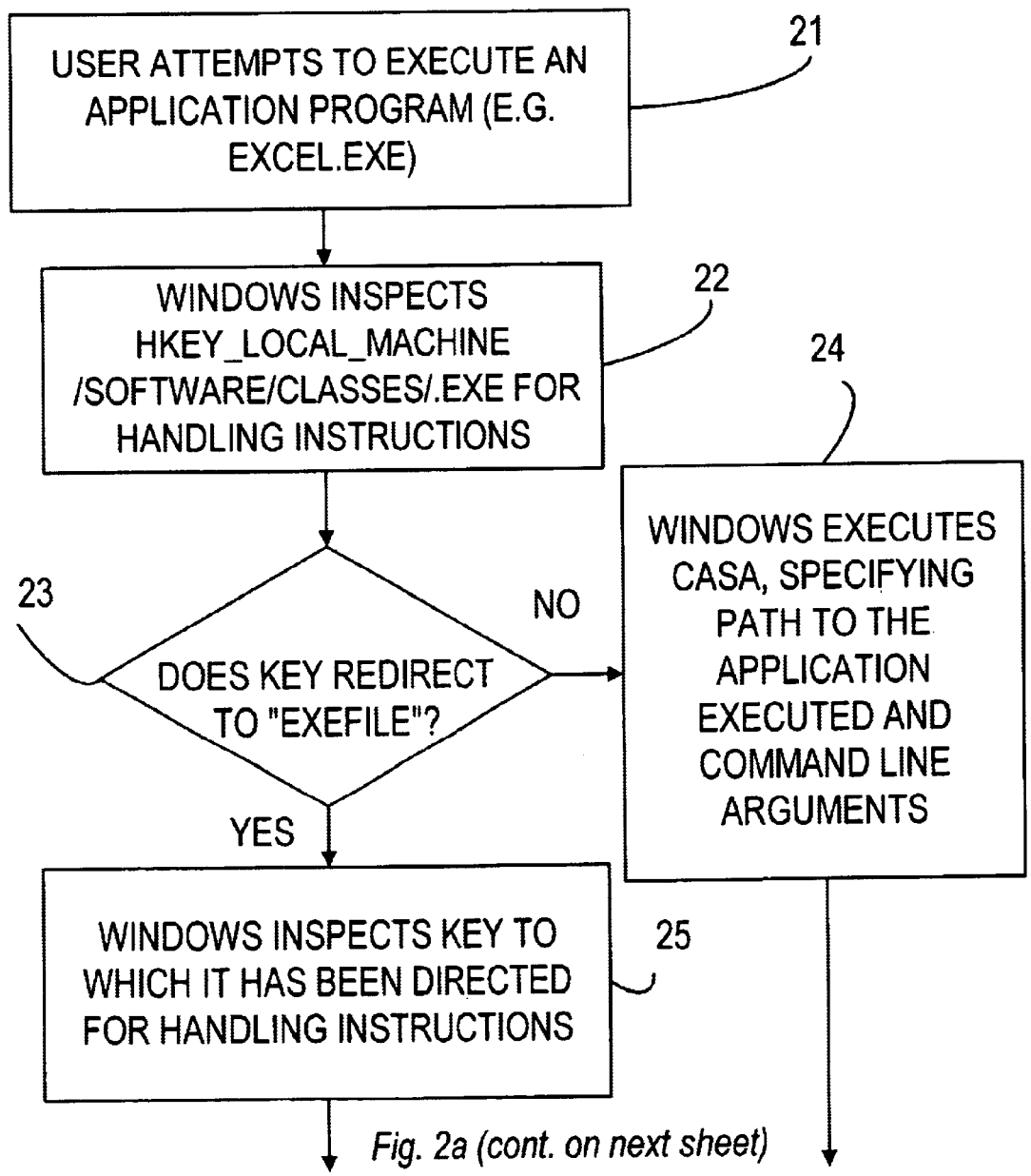
Fig. 2a (cont. on next sheet)

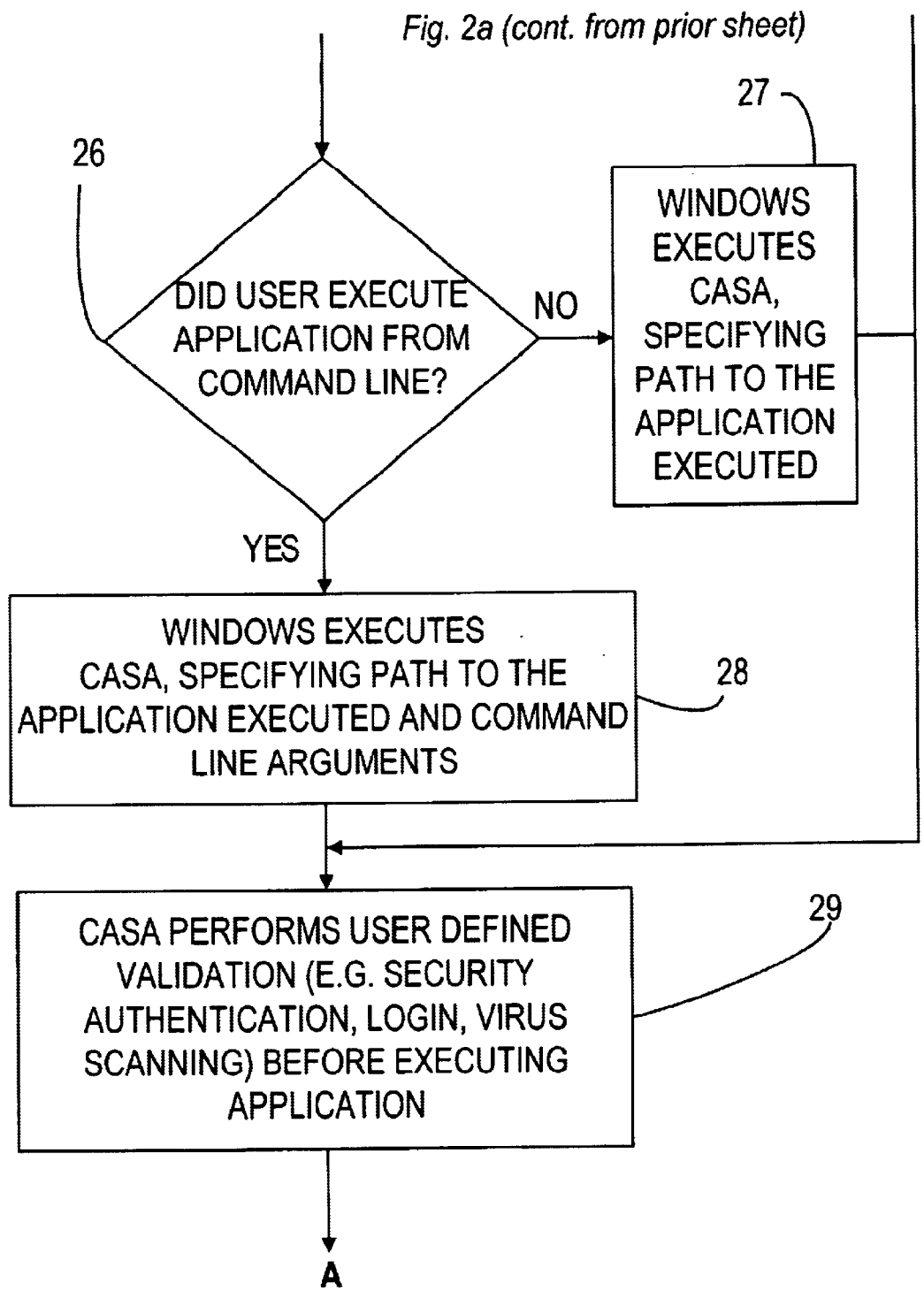
Fig. 2a (cont. from prior sheet)

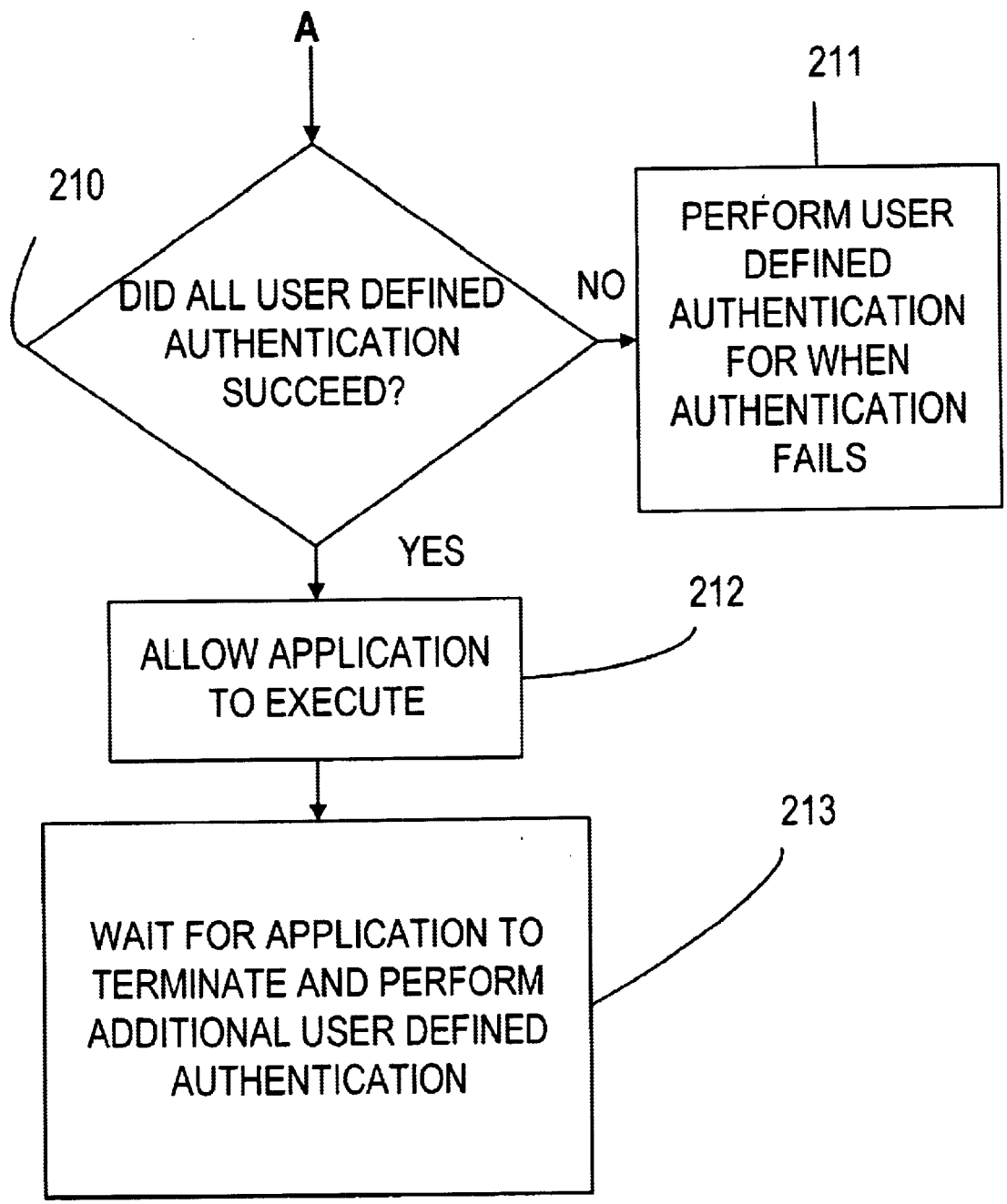
AUTHENTICATION PROGRAM FOR A COMPUTER OPERATING SYSTEM - FIGURE 2B
METHOD BY WHICH THE PRESENT INVENTION ALTERS MICROSOFT® WINDOWS® APPLICATION EXECUTION

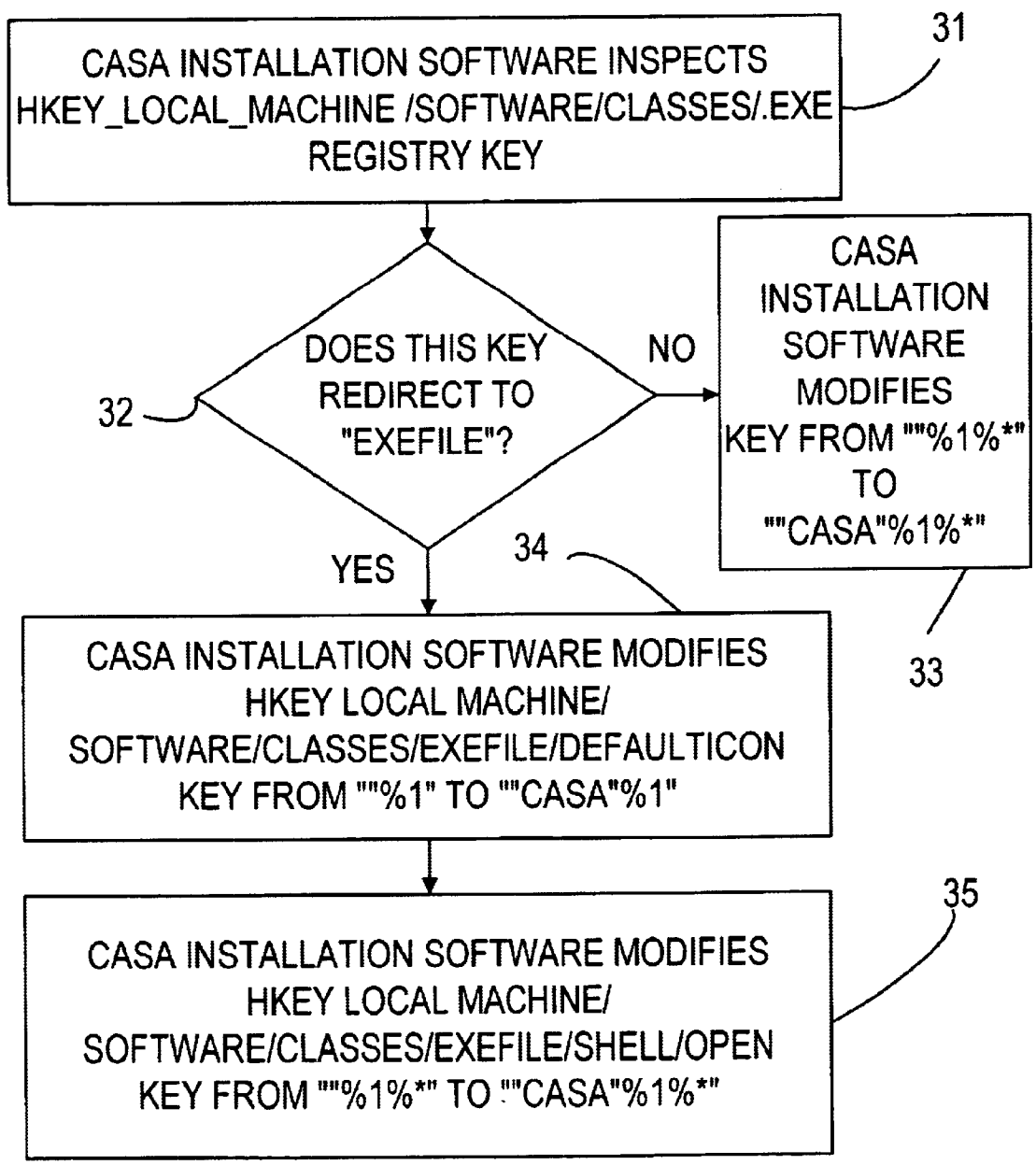

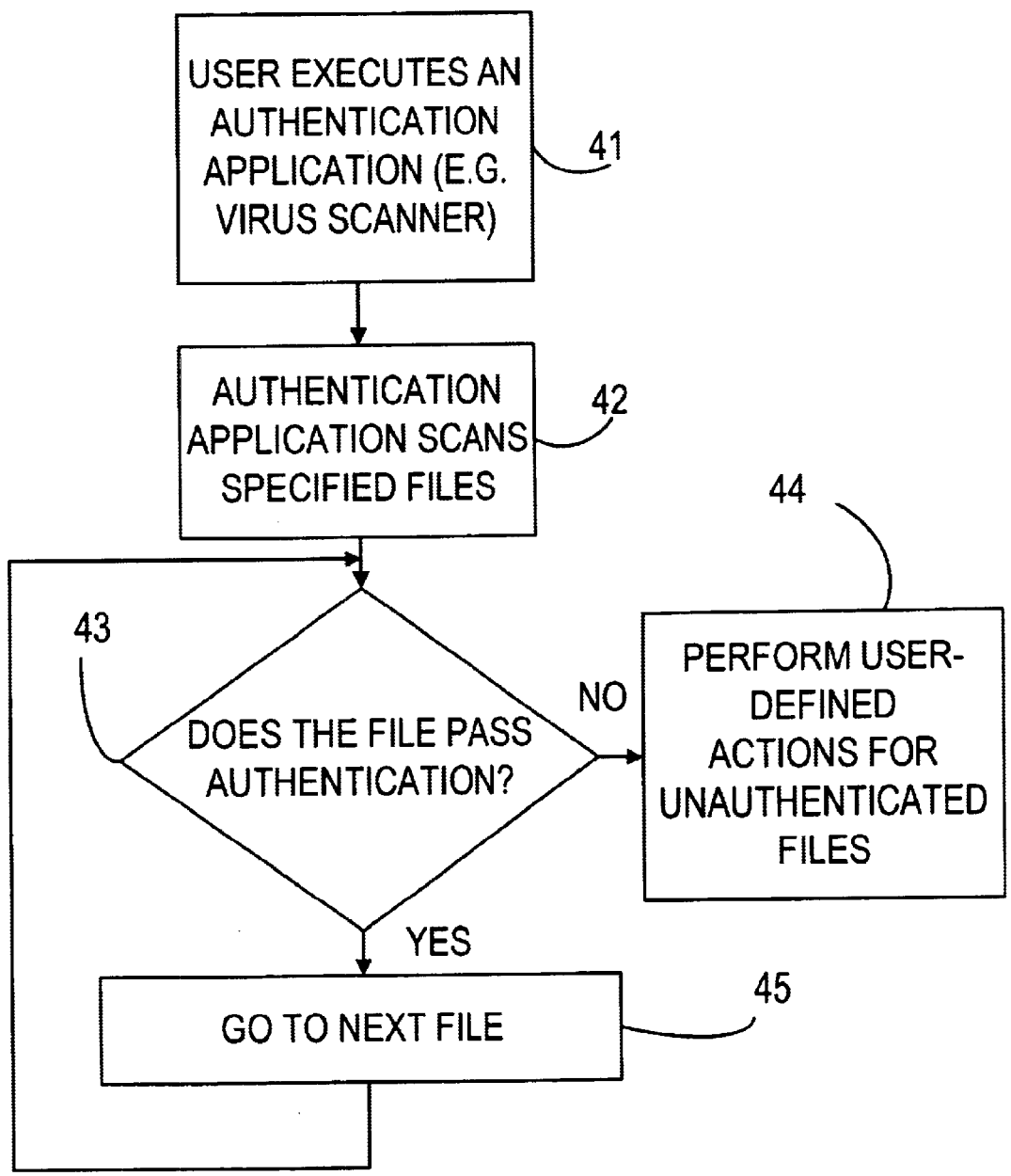
AUTHENTICATION PROGRAM FOR A COMPUTER
OPERATING SYSTEM - FIGURE 4
(PRIOR ART) USER EXECUTES AUTHENTICATION
APPLICATION

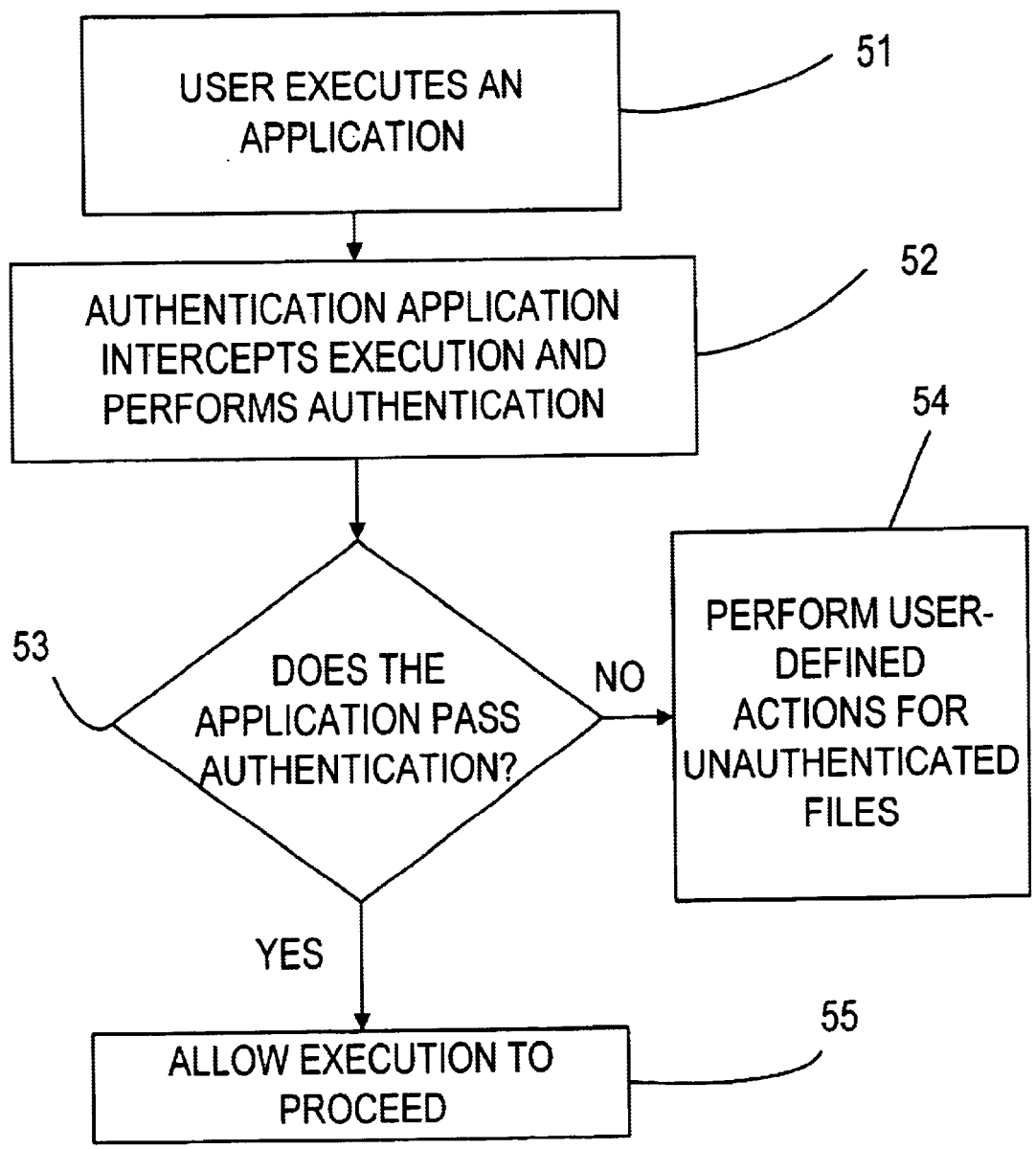

AUTHENTICATION PROGRAM FOR A COMPUTER OPERATING
SYSTEM - FIGURE 6
C CODE EXAMPLE OF CASA FUNCTION TO ENABLE CASA
AUTHENTICATION

```c
#include <windows.h>
#include <stdio.h>
#define REG_KEY_DEFAULT_SIZE      256
#define ERROR_SET_REGISTRY_KEY    -1
int EnableCasaExefile(char *1pszPreviousiconValue,
char *1pszPreviousCommandValue)
{
  long DefaultSize= REG_KEY_DEFAULT_SIZE;
  HKEYhkOpenKey,hkBaseKey = HKEY_LOCAL_
  MACHINE;
  char czExeKey[]  =
  "SOFTWARE\\Classes\\exefile\\shell\\open\\command";
  char czExeIco[] =
  "SOFTWARE\\Classes\\exefile\\Default2con";
//////////////////////////////////////////////////////////
// Try to open the
SOFTWARE\\Classes\\exefile\\DefaultIcon key.
```

*Figure 6 (cont. on next sheet)*

↓ *Figure 6 (cont. from prior sheet)*

```
if(RegOpenKey(hkBasekey,czExelco,&hkOpenKey)
== ERROR_SUCCESS)
{
///////////////////////////////////////
// Get the original key and store it
    RegQueryValue(hkOpenKey,"",1pszPreviousIconValu
    e,&DefaultSize);
///////////////////////////////////////
// Set the key to the casa intercept
RegSetValue(hkOpenKey, "",REG_SZ
,"\"c:\\casaDir\\Casa.exe \"%1\"",
REG_KEY_DEFAULT_SIZE);
RegCloseKey(hkOpenKey);
}
else
{
///////////////////////////////////////
// If the open failed, return an error
return ERROR_SET_REGISTRY_KEY;
///////////////////////////////////////
// Follow the same process for the command key
```

↓ *Figure 6 (cont. on next sheet)*

↓ *Figure 6 (cont. from prior sheet)*

```
if(RegOpenKey(hkBaseKey,czExeIco,&hkOpenKey) = =
ERROR_SUCCESS)
{
RegQueryValue(hkOpenKey,"",1pszPreviousCommandV
alue,&DefaultSize);
RegSetValue(hkOpenKey,"",REG_SZ
,"\"c:\\casaDir\\Casa.exe \"%1\"",REG_KEY_DEFAULT_
SIZE);
RegCloseKey(hkOpenKey);
}
else
{
////////////////////////////////////////////////
// If the open failed, return an error
return ERROR_SET_REGISTRY_KEY;
}
////////////////////////////////////////
// The operation was successful
return ERROR_SUCCESS;
}
```

AUTHENTICATION PROGRAM FOR A COMPUTER OPERATING SYSTEM - FIGURE 7
C CODE EXAMPLE OF CASA FUNCTION TO DISABLE CASA AUTHENTICATION

```c
#include <windows.h>
#include <stdio.h>
#define REG_KEY_DEFAULT_SIZE      128
#define ERROR_SET_REGISTRY_KEY    1
int DisableCasaExefile(char
*1pszPreviousIconValue,char
*1pszPreviousCommandValue)
{
int DefaultSize = REG_KEY_DEFAULT_SIZE
HKEY hkOpenKey, hkBaseKey=
HKEY_LOCAL_MACHINE;
char
czExeIco[]="SOFTWARE\\Classes\\exefile\\DefaultIcon";
charczExeKey[]=
"SOFTWARE\\Classes\\exefile\\shell\\open\\command";
//////////////////////////////////////////////////////////////
// If the previousvalues are set to NULL, set the keys to
their default.
```

*Figure 7 (cont. on next sheet)*

*Figure 7 (cont. from prior sheet)*

```
if(1pszPreviousIconValue == NULL)
        strcpy(1pszPreviousIconValue, "%1");
// %1
if(1pszPreviousCommandValue == NULL)
        strcpy(1pszPreviousCommandValue, "\"%1\"
%*"); // %1"%*"
////////////////////////////////////////////////////////////////
// Reset the previous or default DefaultIcon value
if(RegOpenKey(hkBaseKey,czExeIco,&hkOpenKey) ==
ERROR_SUCCESS)
{
RegSetValue(hkOpenKey,"",REG_SZ
,1pszPreviousIconValue,REG_KEY_DEFAULT_SIZE);
RegCloseKey(hkOpenKey);
}
else
{
```

*Figure 7 (cont. on next sheet)*

↓ *Figure 7 (cont. from prior sheet)*

////////////////////////////////////////////////
// If the open failed, return an error
return ERROR_SET_REGISTRY_KEY;
}
//////////////////////////////////////
// The operation was successful
return ERROR_SUCCESS;
}

/////////////////////////////////////////////////////
// If the open failed, return an error
return ERROR_SET_REGISTRY_KEY;
}

AUTHENTICATION PROGRAM FOR A COMPUTER OPERATING SYSTEM - FIGURE 8

```
#include <windows.h>
#include <stdio.h>
#define VIRUS_DETECTED 1
void CasaInterceptFunction(void)
{
PROCESS_INFORMATION   proc_info;
STARTUPINF            start_info;
DWORD      ret;
Char       szCallProgram[_MAX_PATH];
LPSTR      1pFullArg;
///////////////////////////////////
// Isolate the target program name
1pFullArg = GetCommandLine();
1pFullArg = stratr(l1FullArg,
                  "CASA.EXE");
1pFullArg = stratr(1pFullArg," ");
1pFullArg++;
///////////////////////////////////////////
```

*Figure 8 (cont. on next sheet)*

↓ *Figure 8 (cont. from prior sheet)*

```
// Build the command line
// to run authentication
strcpy(szCallProgram,
            "C:\\CASA\\VFIND.EXE \"");
strcat (szCallProgram,1pFullArg);
atrcat (szCallProgram,"\"");
//////////////////////////////
// Initialize the CreateProcess
// STARTUPINFO struct
start info.cb=sizeof (start_ info);
start_info.1pReserved = NULL;
start_info.1pDesktop = NULL;
start_info.1pTitle = NULL;
start_info.cbReserved2 = 0;
start_info.1pReserved2 = NULL;
////////////////////////////////////////////////////////
// NOTE 1. External authentication
// program (virus scanner) is called.
```

*Figure 8 (cont. on next sheet)* ↓

↓ *Figure 8 (cont. from prior sheet)*

```
/////////////////////////////////////////////
CreateProcess (NULL, szCallProgram,
         NULL, NULL, FALSE,
         DETACHED_PROCESS, NULL, NULL,
         &start_info, &proc_info);
/////////////////////////////////////////////
// Wait for scanner to finish.
while (1)
{
GetExitCodeProcess (
         proc_info.hProcess,
         (LPDWORD) &ret);
         if (ret != STILL_ACTIVE)
    break;
}
```

↓ *Figure 8 (cont. on next sheet)*
↓

↓ *Figure 8 (cont. from prior sheet)*

```
//////////////////////////////////////////////////////////////
// NOTE 2. Action taken based on return value
// from scanner. If a virus was detected, alert
// the user and exit without allowing the
// infected file to execute.
//////////////////////////////////////////////////////////////
if(ret==VIRUS_DETECTED)
{
        char Alert[_MAX_PATH];
        sprintf(Alert,
        "Virus was detected in %s.",
        1pFullArg);
        MessageBox(NULL,Alert,
        "CASA Alert Message",
        MB_OK);
        exit(0);
}
```

↓ *Figure 8 (cont. on next sheet)*

↓ *Figure 8 (cont. from prior sheet)*

```
///////////////////////////////////////////////////////
// NOTE 3. Other authentication program
// can be called here.
///////////////////////////////////////////////////////
// If the program has passed authentication
// test(s) it is now allowed to execute.

start_info.cb = sizeof (start_info);
start_info.1pReserved = NULL;
start_info.1pDesktop = NULL;
start_info.1pTitle = NULL;
start_info.cbReserved2 = 0;
start info.1pReserved2 = NULL;
CreateProcess (NULL, 1pFullArg,
        NULL, NULL, FALSE,
        DETACHED_PROCESS,
        NULL, NULL,
```

↓ *Figure 8 (cont. on next sheet)*

*Figure 8 (cont. from prior sheet)*

```
        &start_info,
        &proc_info);
////////////////////////////////////////////////
// NOTE 4. If there are any authentication programs
// to run after the program, we must wait for it
// to finish. Otherwise exit here. Exit(O);
////////////////////////////////////////////////
// Wait until the target program is done.
while (1)
{
GetExitCodeProcess (
    proc info.hProcess,(LPDWORD) &ret);
    if (ret != STILL_ACTIVE)
    break;
}
////////////////////////////////////////////////
// NOTE 5. Authentication programs that run after
// the target program can be run here
////////////////////////////////////////////////
exit (0);
}
```

AUTHENTICATION PROGRAM FOR A COMPUTER OPERATING SYSTEM

FIELD OF THE INVENTION

This invention relates to Microsoft® Windows® operating system file authentication. More specifically, it relates to a method of authenticating the security and integrity of files in any operating system utilizing the Microsoft® Windows® registry by altering the way in which said operating system executes application programs. Alteration is accomplished by modifying the Windows® registry.

BACKGROUND OF THE INVENTION

Microsoft® Windows® is a computer operating system that allows a user to execute application programs as well as perform many other functions, such as authenticating the identity of the user, executing an application or logging the identity of a user who has accessed or modified data files.

The Windows® operating system must know what type of application to execute for each type of data file or application. The database specifying which data file type is paired with which application is called the Windows® registry. Information is stored in the registry in a tree structure, so that the operating system can easily find information related to a particular kind of file, and each such file is referred to as a class of file. Each actual piece of information is stored in an information structure called a key.

A computer virus is a small computer program that, when executed, performs actions which can be malicious, such as deleting files or causing excessive network traffic. These virus programs are written so that they can place themselves into other programs or data files and, when placed on another computer and executed, infect the new computer with the virus, perform actions, and continue to replicate from there.

The term authentication, as it is being used in the present invention, means that a file must be authenticated as being suitable to execute on a computer system before it is executed. Virus detection applications are a classic type of authentication application, but other types of authentication may include verifying the name and password of a user before the application is executed in order to enhance system security, file change detection, license auditing, activity logging, or version checking, and the like. Virus detection applications perform their actions by identifying the characteristics of viruses within application and data files and removing the virus before execution, ignoring the infection, isolating the infected file, or denying access to the file pending action from the user. The action to take in the event of virus infection is user defined.

Current methods of virus detection generally occur in one or both of the following manners. According to one method, the user schedules for automatic execution or directly executes the virus detection application (FIG. 4, 41), which scans all memory and files on a computer hard drive to detect the characteristics of known viruses (FIG. 4, 42). If a file passes the authentication process, the file is uninfected (FIG. 4, 43), and the detection application goes on to the next file (FIG. 4, 45). If the file does not pass authentication (FIG. 4, 43), the detection application performs user-defined procedures to isolate or fix the unauthenticated files (FIG. 4, 44). A second method of virus detection employs an application program which runs simultaneously with the running of the operating system, that is, they run together. In this system, when the user executes an application (FIG. 5, 51), the detection software intercepts the execution and attempts to authenticate the application (FIG. 5, 52). If the application is properly authenticated (FIG. 5, 53), the execution is allowed to proceed normally (FIG. 5, 55). If the application does not pass authentication (FIG. 5, 53), then user-defined actions are performed on the application, such as not allowing the application to be executed (FIG. 5, 54).

The first method of virus authentication is lacking because it requires a computer user to regularly execute the detection software. The second method is eqaully unapt because it requires an authentication application to be executing at all times, consuming computing resources even when not needed and potentially interfering with system performance.

The present invention overcomes the above noted limitations by altering the method in which Windows® executes application programs, causing an authentication application to perform user defined actions to verify the integrity of the application program files before application program execution can progress, acting without intervention from the user, and terminating once authentication has occurred, thus releasing computing resources back to the operating system.

SUMMARY OF THE INVENTION

The present invention is known as a Computer Authentication System, CASA, and has two primary aspects: 1) the manner in which the Microsoft® Windows® registry is modified, and 2) the method by which the changes to the Windows® registry dispatches the executed file information to one or more authentication functions. The present invention includes a standard interface, called an Application Programming Interface, API, for specifying the authentication functions which are to be performed and executed on a single, stand-alone computer in real time or from a connected remote computer system across a network. Authentication functions can include, but are not limited to, virus scanning functions such as those disclosed in Cozza\815 and Dotan\517.

The main aspect of the present invention is to minimize computer resource usage by executing authentication functions only when a user starts to execute an application program.

Other aspects of this invention will appear from the following description and appended claims, reference being made to the accompanying drawings which form a part of this specification and wherein the referenced characters correspond to the like-referenced characters in the specification.

BRIEF DESCRIPTION OF THE FIGURES

FIG. 1 is a flowchart of prior art showing the method by which Microsoft® Windows® executes application programs.

FIGS. 2a and 2b are flowcharts showing the manner in which the present invention alters the Microsoft® Windows® method for executing application programs.

FIG. 3 is a flowchart detailing the method by which the present invention alters the Microsoft® Windows® registry.

FIG. 4 is a flowchart of prior art, detailing the method by which user executed authentication programs authenticate computer files.

FIG. 5 is a flowchart of prior art, detailing the method by which constantly running authentication applications authenticate computer files.

FIG. 6 is a C code example of a function to enable CASA authentication.

FIG. 7 is a C code example of a function to disable CASA authentication.

FIG. 8 is a C code example of a CASA authentication function.

This invention will now be described in detail by making reference to the following embodiment; however, it is to be understood that the embodiment is presented for illustration purposes only and that the invention described is not limited in its application to the details of the particular arrangement shown but, instead, is capable of wide variation and modification. Also, the terminology used herein is intended solely for the purpose of description and not by way of limitation.

DETAILED DESCRIPTION OF THE PREFERED EMBODIMENT

In order to execute an application, the Windows® operating system searches the registry for keys related to the class of file being executed. For most applications, this class type is '.exe', and this is the type that will be described in this example. The registry key for a particular file class can define directly how a file is to be handled, or redirect Windows® to another registry key for this information.

When the user attempts to execute an .exe file (FIG. 1, 11), Windows® will find information under the registry key HKEY_LOCAL_MACHINE/SOFTWARE/Classes/.exe (FIG. 1, 12). The information in this registry key may either contain information allowing Windows® to directly handle files of this class or redirect Windows® to another class key for handling information (FIG. 1, 13).

In some cases, the information in this key will contain the string ""%1" %*", where "%1" represents the full directory path name of the application file to execute for this class of file and "%*" represents all command line options to be passed to the program. Command line arguments may include information such as the name of the data file that the application should open immediately upon executing, and/or modifying the way in which the application or data file are processed (FIG. 1, 14).

More often, the default handling information in HKEY_LOCAL_MACHINE/SOFTWARE/Classes/.exe will redirect Windows® to HKEY_LOCAL_MACHINE/SOFTWARE/Classes/exefile. In the exefile key, there are at least two sub-keys that are of concern to the present invention. 1) HKEY_LOCAL_MACHINE/SOFTWARE/Classes/exefile/DefaultIcon provides information on how to directly execute an application program without specifying a data file to open (FIG. 1, 16). This entry will contain the string "%1", which will simply execute the application program without passing any command line arguments (FIG. 1, 17). 2) HKEY_LOCAL_MACHINE/SOFTWARE/Classes/exefile/shell/open specifies how to handle applications run from a shell, such as when a user executes an application by typing the name of the application at a DOS command prompt. This registry key will contain the string ""%1" %*", specifying to Windows® that the application should be executed and passed any command line arguments specified by the user (FIG. 1, 18).

The installation of the CASA software modifies the Windows® registry by inspecting it for the information in the key HKEY_LOCAL_MACHINE/SOFTWARE/Classes/.exe (FIG. 3, 31). If the registry key does not redirect the operating system to the "exefile" key (FIG. 3, 32), said registry key will typically contain the information ""%1%*". This key is modified to ""CASA"%1%*", specifying that the CASA software should be executed, passing the name of the application to be executed, along with all program arguments (FIG. 3, 33). If the information at HKEY_LOCAL_MACHINE/SOFTWARE/Classes/.exe does redirect the operating system to the "exefile" key (FIG. 3, 32), the installation software modifies HKEY_LOCAL_MACHINE/SOFTWARE/Classes/exefile/DefaultIcon from ""%1" to ""CASA"%1" (FIG. 3, 34) and HKEY_LOCAL_MACHINE/ SOFTWARE/Classes/exefile/shell/open from ""%1%*" to ""CASA"%1%*" (FIG. 3, 35).

These modifications to the registry have the effect of changing the method in which Windows® executes a file from the method described in FIG. 1 to the method described in FIGS. 2a and 2b. When the user attempts to execute an application program (FIG. 2a, 21), Windows® inspects the contents of the HKEY_LOCAL_MACHINE/SOFTWARE/Classes/.exe key (FIG. 2a, 22). If the key does not redirect Windows® to another key (FIG. 2a, 23), Windows® executes the CASA software, specifying the path to the application file and any command line arguments to the file (FIG. 2a, 24). If the key does redirect Windows® to the HKEY_LOCAL_MACHINE/SOFTWARE/Classes/exefile key, Windows® inspects the information in this key (FIG. 2a, 25). If the user did not execute the application from a command line (in a DOS shell) (FIG. 2a, 26), Windows® executes the CASA software, specifying only the path to the application file (FIG. 2a, 27). If the user did execute the application from a command line, Windows® executes the CASA software, specifying the path to the application file and all command line arguments to the file (FIG. 2a, 28). Upon execution, CASA performs all user defined authentication functions upon the application file before allowing the application to execute (FIG. 2a, 29). Authentication functions may include, but are not limited to, security checking, access logging, and virus scanning. If any of the user defined authentication functions fail (FIG. 2b, 210), CASA can perform a user defined action or actions, usually including some form of user notification of the failure and disallowing start of the application (FIG. 2b, 211). If all user defined authentication functions succeed (FIG. 2b, 210), CASA will execute the application with a call to the Windows® function CreateProcess (FIG. 2b, 212). The CASA software can terminate after process execution is complete, or can remain active until the created process terminates in order to perform additional user defined authentication upon application termination (FIG. 2b, 213).

Three examples of CASA behavior follow.

Since computer viruses are activated when an application containing a virus is executed, CASA may execute an antivirus scanning application to check each application program before it is executed. When used in this manner, CASA executes the antivirus application, passing it the filename of the application executed by the user. The antivirus application returns a value indicating success or failure of the scan and CASA takes appropriate action.

Additional file security can be achieved by having CASA execute a function which asks a user for a password each time a file is accessed.

Some computer viruses infect application programs by modifying the application files when executed. CASA has the ability to check for this behavior by making a copy of the application program about to be executed, executing the application while remaining active until the application program terminates, comparing the application files following termination with the copy made before execution, notifing the user if the application files have been modified in any way, restoring the modified files from the copies, and removing the copies.

The present invention improves on current methods of authentication by providing a means to perform multiple authentication functions to a single file, executing authentication functions without user intervention, and consuming computing resources only when needed.

The preferred embodiment of the present invention includes a 32-bit Windows® executable application program and supplementary applications that perform authentication functions (e.g. virus scanners, security applications, data loggers) and allow administrative users to specify the activation, deactivation, and configuration of the CASA software.

Activation and deactivation of authentication functions require modifying and restoring the values of specific keys in the Windows® registry. Configuration requires specifying to the CASA application what authentication functions are to be executed and what to do in the event of authentication failure.

The present invention has been described by reference to preferred embodiments; however, it will be appreciated that this invention is also subject to modification and to the extent that any such alterations or variations would be obvious to one of ordinary skill in this field, they are considered being within the scope of the appended claims.

What is claimed is:

1. A method for causing the authentication of computer application and data files after computer startup comprising the steps of:
   receiving a user command to execute an application program in an operating system execution control system;
   scanning a registry in said operating system execution control system in order to determine if an authentication program shall be executed prior to execution of said application program;
   executing said authentication program;
   specifying to said authentication program a path to said application program and related files;
   allowing said authentication program to act on said application program and related files;
   preventing an execution of said application program under predetermined conditions; and,
   terminating said authentication program.

2. The method of claim 1, wherein said authentication program executes said application program.

3. The method of claim 1, wherein said authentication program executes a virus scanning function.

4. The method of claim 1, wherein said authentication program comprises a user selectable menu of functions including a virus scanning function.

5. The method of claim 4, wherein the user selectable menu of functions further comprises a password authentication function, a change detection function, a license auditing function, an activity logging function, and a version checking function.

6. The method of claim 1, wherein said operating system execution control subsystem further comprises a registry database having data to correlate application programs with data files.

7. The method of claim 6, wherein said registry database is modified to allow said authentication program to execute.

8. In a Microsoft® Windows® operating system having subsystems including an operating system application execution control subsystem, visual display control, input/output control, memory management, a task scheduler, and a registry database correlating all data file types with an associated application program: the improvement comprising:
   receiving a user command to execute an application program in the Microsoft® Windows® operating system execution control subsystem;
   executing an authentication program specified by data contained in the Microsoft® Windows® registry database, wherein the Microsoft® Windows® registry database is modified by:
      modifying the information in registry database key HKEY_LOCAL_MACHINE/SOFTWARE/Classes/.exe to contain the string ""CASA"%1%*", if the data contained in said registry database key does not redirect the operating system execution control subsystem to the registry key HKEY_LOCAL_MACHINE/SOFTWARE/Classes/exefile;
      modifying the information in registry database key HKEY_LOCAL_MACHINE/SOFTWARE/Classes/exefile/Default icon to contain the string ""CASA"%1"; and
      modifying the information in registry database key HKEY_LOCAL_MACHINE/SOFTWARE/Classes/exefile/shell/open to contain the string ""CASA"%1%*"
   to cause the Microsoft® Windows® operating system execution control subsystem to execute said authentication program;
   specifying to said authentication program a path to said application program and related files;
   allowing said authentication program to act on said application program and related files; and
   preventing an execution of said application program under predetermined conditions.

* * * * *